(No Model.) 5 Sheets—Sheet 1.

T. LONG.
CENTRIFUGAL MACHINE.

No. 454,056. Patented June 16, 1891.

WITNESSES
J. M. Dolan
J. T. Ball

INVENTOR
Thomas Long
by his attys
Clarke & Raymond (No Model.) 5 Sheets—Sheet 3.

T. LONG.
CENTRIFUGAL MACHINE.

No. 454,056. Patented June 16, 1891.

WITNESSES.

INVENTOR.

(No Model.) 5 Sheets—Sheet 4.

T. LONG.
CENTRIFUGAL MACHINE.

No. 454,056. Patented June 16, 1891.

WITNESSES. INVENTOR.

UNITED STATES PATENT OFFICE.

THOMAS LONG, OF BOSTON, MASSACHUSETTS.

CENTRIFUGAL MACHINE.

SPECIFICATION forming part of Letters Patent No. 454,056, dated June 16, 1891.

Application filed June 16, 1890. Serial No. 355,553. (No model.)

*To all whom it may concern:*

Be it known that I, THOMAS LONG, of Boston, in the county of Suffolk and State of Massachusetts, a citizen of the United States, have invented a new and useful Improvement in Centrifugal Machines, of which the following is a full, clear, and exact description, reference being had to the accompanying drawings, forming a part of this specification, in explaining its nature.

The invention is an improvement upon that described in my application for Letters Patent of the United States, filed May 3, 1889, Serial No. 309,435, and it relates particularly to the shape of the chamber or casing surrounding the rotary portion of the machine, to its division into two sections or parts, each of which communicates with an outlet, and to the employment, in connection with said peculiarly-shaped case, of an exhausting device of novel arrangement.

It further relates to various details of construction and organization, all of which will hereinafter be fully described.

Figure 1:
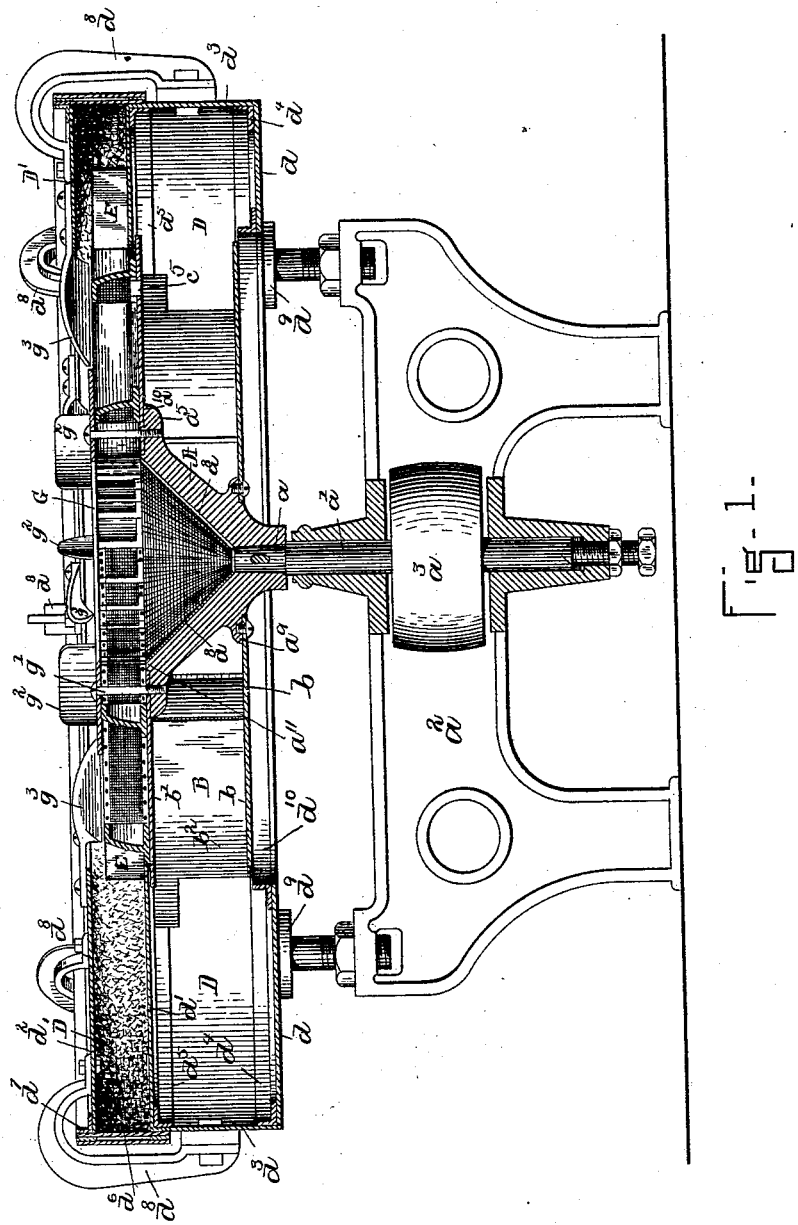
Figure 2:
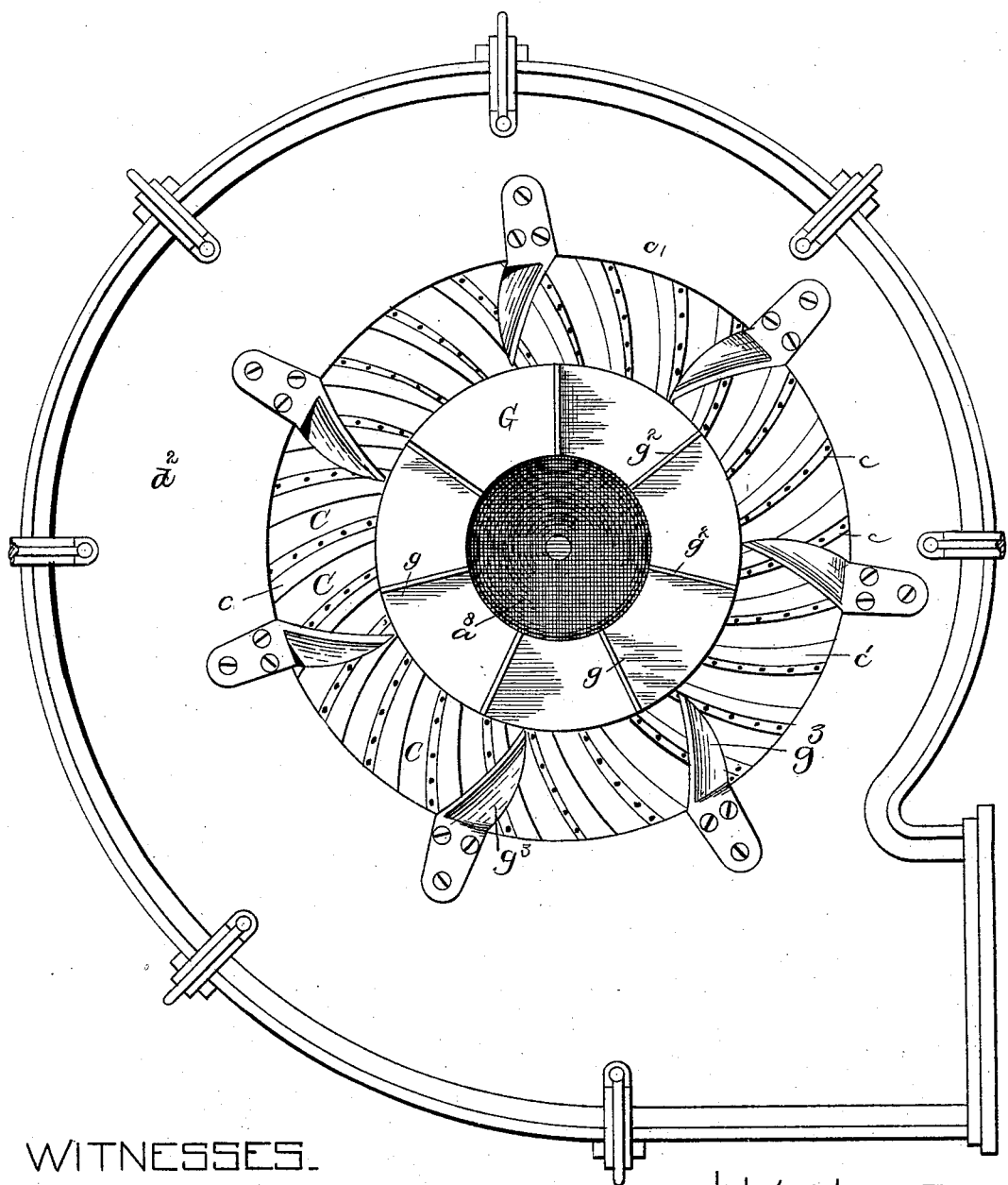
Figure 3:
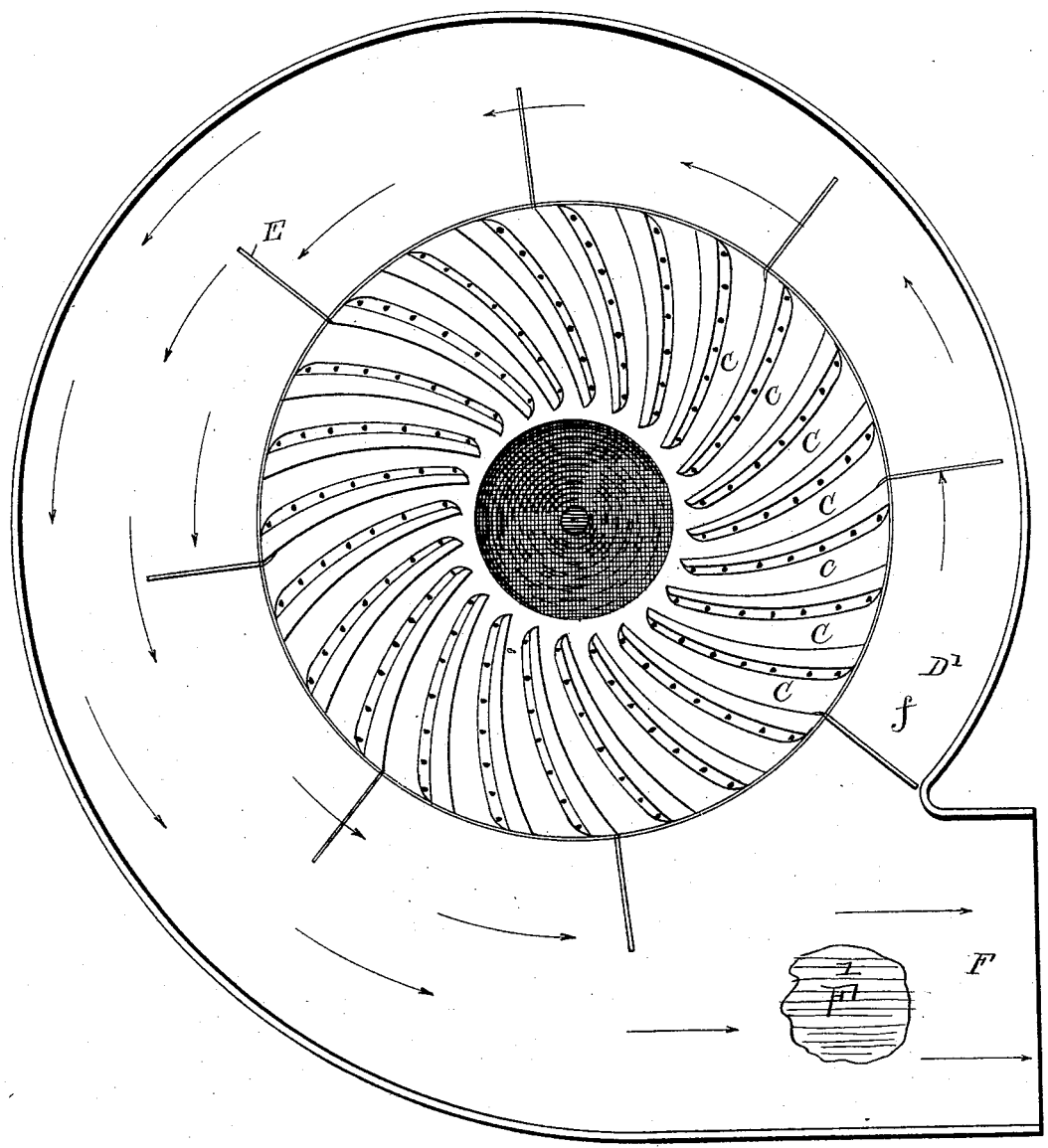
Figure 4:
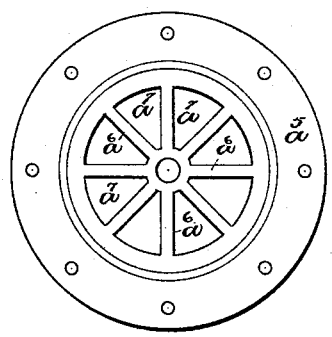
Figure 5:
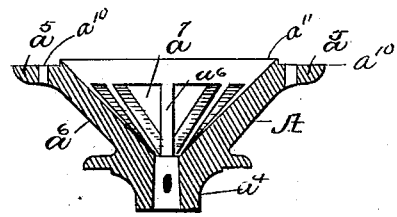
Figure 6:
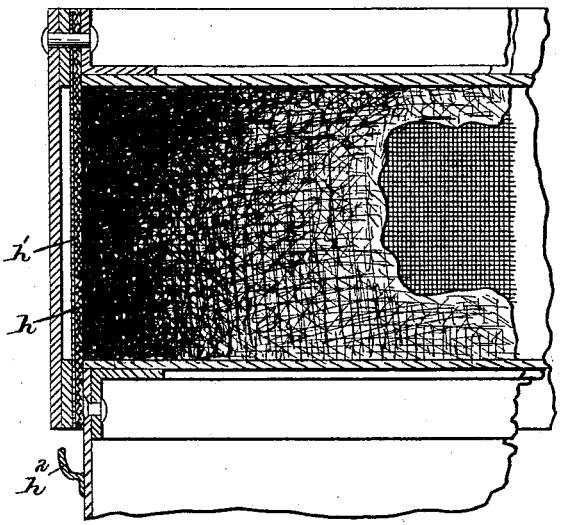
Figure 7:
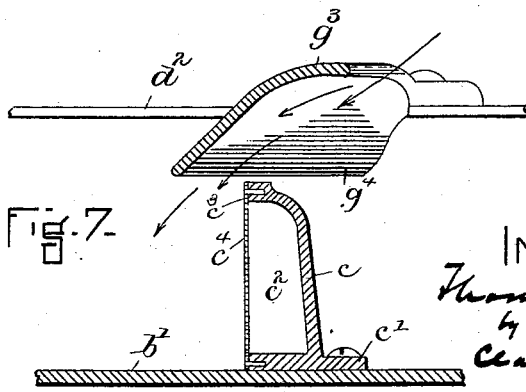
Figure 8:
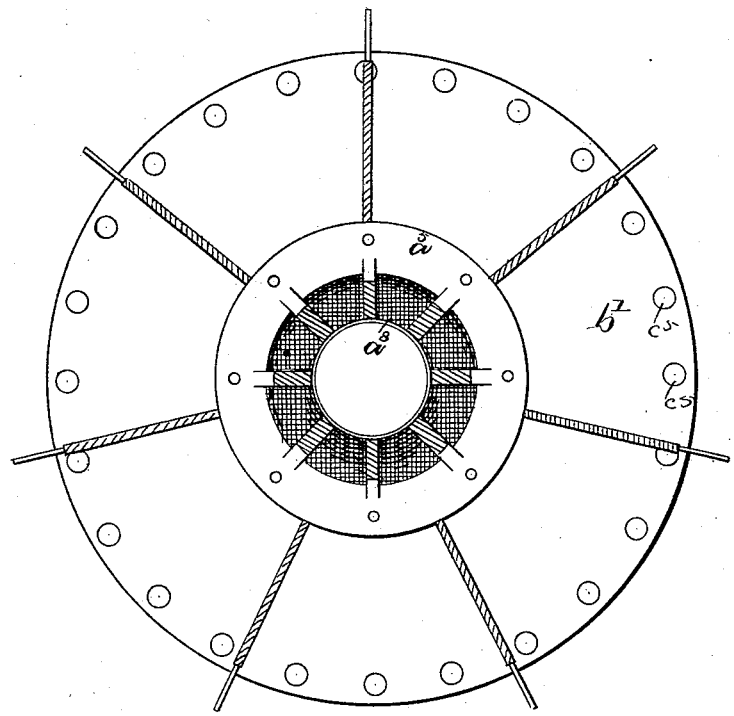

In the drawings, Figure 1 is a view, principally in vertical central section, of a machine having the features of my invention. Fig. 2 is a plan view thereof. Fig. 3 is a view, principally in plan, with the upper part of the machine removed to show the relation which the rotary part of the mechanism bears to the chamber which surrounds it and to the outlet from said chamber to illustrate the manner in which the material is forced from the machine. Fig. 4 is a view in plan of the rotary central cup without its lining. Fig. 5 is a view in vertical central section thereof. Fig. 6 is a detail view of a modification, to which reference will hereinafter be made.
Fig. 7 is a detail view to illustrate the operation of the blower which forces air into the machine; and Fig. 8 is a view, principally in plan, to illustrate the main blower or exhaust.

Referring to the drawings, A represents an inverted-cone-shaped cup. It is mounted on the upper end $a$ of a vertical shaft $a'$. This shaft has suitable supports in the frame $a^3$, and carries the pulley $a^3$, by which it is driven. The cup A is well shown in Figs. 1, 4, and 5. It is a casting, and has the continuous base or lower section $a^4$, the continuous upper ring $a^5$, and the connecting-arms $a^6$, between which are openings $a^7$. The inner surface of the cup is lined with wire-gauze $a^8$, of fine mesh. The cup also has the lower flange $a^9$, and the upper ring $a^5$ has a plate-supporting section $a^{10}$, somewhat lower than the edge $a^{11}$ about the entrance to the cup. There is bolted or attached to the flange $a^9$ a plate $b$, (see Fig. 1,) and to the ring $a^{10}$ a plate $b'$. These plates extend horizontally and form supports for the blades $b^2$ of the main blower B. There is mounted upon the plate $b'$ a series of curved castings $c$, called "separators." Each of these castings has a lower flange $c'$, by which it is bolted to its supporting-plate, and each has a cavity or passage $c^2$ and edges or faces $c^3$, to which wire-gauze $c^4$, of fine mesh, is fastened by clamp-plates or in any other desired way. The shape of the casting is such that the passage $c^2$ within it, covered by the gauze on one side, increases in width and size from its inner end outward, and in the outer end of each casting there is a hole $c^5$, which opens into the chamber D. These castings are separated from each other upon their supporting-plate to furnish the passages C, through which the material fed to the cup is forced and driven from it to the chamber D', into which the said passages open. There is also fastened to the plate $b'$ to turn therewith and to extend into the chamber D' the radial blades E. The passages C open directly into the chamber D'. This chamber and the chamber D do not rotate, and are formed by means of the lower plate $d$, the intermediate plate $d'$, which separates the chamber D from the chamber D', and the upper plate $d^2$. These plates are of the same shape. The plates $d$ $d'$ are united to the curved plate $d^3$, which forms the vertical wall of the chamber D, by angle-irons $d^4$ $d^5$, and the plate $d$ is secured to a curved plate $d^6$. It is connected with the wall $d^3$ by means of the hangers $d^8$, which are bolted or otherwise attached to the wall $d^3$, and also to the plate $d^2$, the wall $d^6$ lapping upon the wall $d^3$, and the plate $d^2$ being thus made vertically adjustable in relation to the plate $d'$. This adjustment is made either by changing the hanger $d^6$ and substituting longer or shorter ones therefor or by forming a slot in each hanger, by means of which and its attaching-bolt the vertical position of each hanger upon the wall $d^3$ may be varied, thus varying or changing the relation between the plates $d'$ and $d^2$.

The entire casing is represented as supported by the adjustable supports $d^9$, carried by the frame $a^2$. The lower plate $d$ is represented as being on a slightly lower level than the rotary plate $b$, and the angle-iron $d^{10}$ closes the opening between them and makes a short vertical wall reaching to about the outer edge of the plate $b$. (See Fig. 1.) The upper surface of the plate $d'$ is upon a line or just above the upper surface of the plate $b'$.

The shape of the casing and chambers in relation to the rotary portion of the machine is represented especially in Figs. 2 and 3, and it will there be seen that the chamber is circular in shape and has upon one side a tangential exit or outlet in two parts—namely, the outlet F to the chamber D' and the outlet F' to the chamber D. The centrifugal section of the machine is located eccentrically in this circular chamber, and so that the width of the chamber about it increases from the point $f$ (see Fig. 3) entirely about the chamber to the exit F. In other words, the rotary section of the machine is placed or located in relation to the casing as a fan of a blower is located in relation to its casing, and the casing itself is like the casing of a fan-blower. The object of this construction is to provide means whereby a continuous discharge of the material from the machine is accomplished, and also to do away or prevent the retarding influence of back-pressure usually found in centrifugal machines, and also to cause the rotary portions of the machine, by means of suitable additions or fans, to act as a blower, whereby the discharge of the material from the casing is accomplished, and whereby, also, the circulation of air through the machine is very much facilitated, the action of the fans causing the air to be blown forcibly from the chamber through the air-outlet F' and causing a partial vacuum about the cup and the channels $c^2$, thereby making the air-pressure less upon the outer side of the machine than upon the inside and causing the air above the material to be forced by atmospheric pressure through the material into the partial vacuum about the cup, channels, and rotary parts of the machine.

In Fig. 2 I have shown, in addition to the main blower, an additional upper blower and deflecting-plates for forcing air into the material in the rotary parts of the machine. G represents this upper blower. It consists of the plate $g$, fastened to the plate $b'$ by bolts or screws $g'$, (see Fig. 1,) and radial fans $g^2$, mounted upon said plate. These fans or blades force the air outward against the stationary deflecting-plates $g^3$, which are fastened to the upper plate $d^3$ of the casing. (See Fig. 2.) These deflecting-plates are shaped as represented in Figs 2 and 7—that is, they have the tangentially and inwardly extending sections $g^4$, against which the air is forced by the blades or fans $g^2$, and which deflect or turn downward the air to force it upon the surface of the material which is moved through the passages C upon the rotary plate.

In Fig. 6 I have represented the wall $d^6$ of the chamber D' as lined upon the inner side with wire-gauze $h$, which in turn is lined by felt or other similar material $h'$, and the moisture or liquid which escapes is absorbed by the felt and falls through the felt into the gutter or trough $h^2$ (see Fig. 6) and from thence into the chamber D.

In use the liquid or material to be treated is fed into the cup in any desired way, at any desired temperature, and with or without an air-blast of any required temperature, and the rotation of the cup and attached parts causes the liquid or material to be forced against the perforated wall of the cup and up the same upon the table in front of the rotary arms and to be thrown into the chamber D', from which it is caused to be ejected through the outlet F by the blades E and the outward passage of the air, which is expelled from the casing by the rotation of the blades. At the same time a partial vacuum is being formed about the cup and in the passages $c^2$ by the blower-fan inclosed in the chamber D, whereby air is drawn through the cup and the channels C, while the upper blower G forces air downwardly upon the upper surface of the material being treated. By this mechanism it will be seen that a constant passage of air is maintained through the machine from its upper or open side into the chamber D, that there is no back-pressure in the machine to retard the free passage of the air thus drawn and forced through the material, and that the material after treatment escapes or is forced from the chamber surrounding the machine by means of the air-current caused by the blades E.

Having thus fully described my invention, I claim and desire to secure by Letters Patent of the United States—

1. The combination, in a centrifugal machine, of the rotary section of the machine, a circular casing having an outlet in which the said rotary part of the machine is eccentrically located, said chamber being divided into two sections by a horizontal plate, a blower in the lower section connected with the rotary part of the machine, and blades in the upper section connected with the rotary part of the machine, as and for the purposes described.

2. The combination, in a centrifugal machine, of the rotary section of the machine, a circular casing about the same in which the rotary section is eccentrically located, a partition dividing said casing into two chambers, an opening from each chamber, a suction-blower in the lower chamber connected with the frame of the rotary section, and an air-forcing blower above the rotary section, with stationary deflecting-plates for deflecting the air from the upper blower upon the material passing through the rotary section of the machine, as and for the purposes described.

3. The combination of the rotary section of the machine with the rotary air-forcing blades $g^2$ and deflecting-plates $g^3$, as and for the purposes described.

THOMAS LONG.

In presence of—
 MATTHEW DOLAN,
 JAMES F. O'BRIEN.